(12) United States Patent
Wang et al.

(10) Patent No.: US 8,657,195 B2
(45) Date of Patent: Feb. 25, 2014

(54) DOCUMENT CAPTURE WITH IMAGING-BASED BAR CODE READERS

(75) Inventors: Dayou Wang, Mount Sinai, NY (US); Joseph Cai, Rocky Point, NY (US); Michelle X. Wang, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 24 days.

(21) Appl. No.: 13/246,364

(22) Filed: Sep. 27, 2011

(65) Prior Publication Data

US 2013/0075473 A1    Mar. 28, 2013

(51) Int. Cl.
*G06K 7/10*    (2006.01)
(52) U.S. Cl.
USPC ............................................. 235/454
(58) Field of Classification Search
USPC ............ 235/379, 380, 454, 492, 462.41; 382/181
See application file for complete search history.

(56) References Cited

U.S. PATENT DOCUMENTS

| | | | |
|---|---|---|---|
| 4,831,275 A | 5/1989 | Drucker | |
| 8,096,584 B2 * | 1/2012 | Lei | 283/70 |
| 8,286,068 B2 * | 10/2012 | Brush et al. | 715/201 |
| 2002/0084330 A1 | 7/2002 | Chiu | |
| 2007/0019243 A1 | 1/2007 | Sato et al. | |
| 2007/0119944 A1 | 5/2007 | Cai | |
| 2009/0001167 A1 | 1/2009 | Usuba | |
| 2009/0152357 A1 * | 6/2009 | Lei et al. | 235/454 |
| 2011/0164813 A1 | 7/2011 | Enomoto | |

OTHER PUBLICATIONS

PCT International Search Report Dated Dec. 11, 2012 for Counterpart Application PCT/US2012/054590.

* cited by examiner

*Primary Examiner* — Seung Lee
(74) *Attorney, Agent, or Firm* — Nong-Qiang Fan

(57) ABSTRACT

A method includes (1) obtaining a captured image of a document physically placed on a background having specifically designed patterns; (2) storing into a memory the captured image that includes an image of the document and an image of the background surrounding the document; and (3) analyzing the captured image to search for a boundary of the document in the captured image, where step of analyzing includes distinguishing the image of the background from the image of the document.

24 Claims, 9 Drawing Sheets

*100

Lesketch CUSTOM ORDER FORM

TILE : 4" : $5.00 WHITE CERAMIC   $5.00 BLACK CERAMIC   $5.00 TUMBLED WHITE MARBLE $5.50 GRAY SLATE        $5.00 TUMBLED TRAVERTINE
6" : $10.00 GRAY SLATE      $10.00 TUMBLED TRAVERTINE
10" : $5.00 WHITE CERAMIC
12" : $15.00 WHITE CERAMIC  $15.50 GRAY SLATE

ALL CUSTOMERS PROVIDED TILES ARE SUBMITTED AT THE OWNERS RISK. ARTIST IS NOT RESPONSIBLE FOR LOST OR BROKEN TILES. IF PROVIDING YOUR OWN TILE PLEASE PROVIDE ONE OR TWO EXTRA IN CASE THEY ARE NEEDED. COST IS THE SAME WHETHER ON CUSTOMER PROVIDED TILE OR ON ARTIST PROVIDED TILE.

PAINTING:

| # FROM CUSTOMER ORDER BOOK | QTY | TILE TYPE | PRICE |
|---|---|---|---|
|  |  |  |  |
|  |  |  |  |
|  |  |  |  |
|  |  |  |  |
|  |  |  |  |
|  |  |  |  |

ADDITIONAL INSTRUCTIONS/ NOTES:

SHIPPING: UPS SHIPPING GROUND AT CUSTOMER'S EXPENSE. PLEASE ALLOW APPROXIMATELY 1 WEEK FOR SHIPPING. PRICE ABOVE DOES NOT INCLUDE SHIPPING. PAYMENT DUE UPON RECEIVING FINISHED PRODUCT. SEALANTS REQUIRE 1 WEEK DRYING TIME. PLEASE ALLOW TWO WEEKS FROM TIME PRODUCT IS PAINTED UNTIL YOU RECEIVE YOUR ORDER. ADDITIONAL TIME REQUIRED DEPENDANT ON CURRENT ARTIST VOLUME.

CONTACT INFORMATION: _____

NAME                PHONE

ADDRESS          CITY          STATE          ZIP

*FIG. 4*

DOCUMENT CAPTURE WITH IMAGING-BASED BAR CODE READERS

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes.

One of the applications of the imaging scanner is for document capture. Document capture is to segment a document from an image containing the document. It is desirable to improve the document capture processes when the documents to be captured have irregular patterns, irregular shapes, or boxes that can be confused with the boundaries of the documents.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 shows a document that has some rectangular boxes that look like a border but only contains part of the document.

Figure 1:
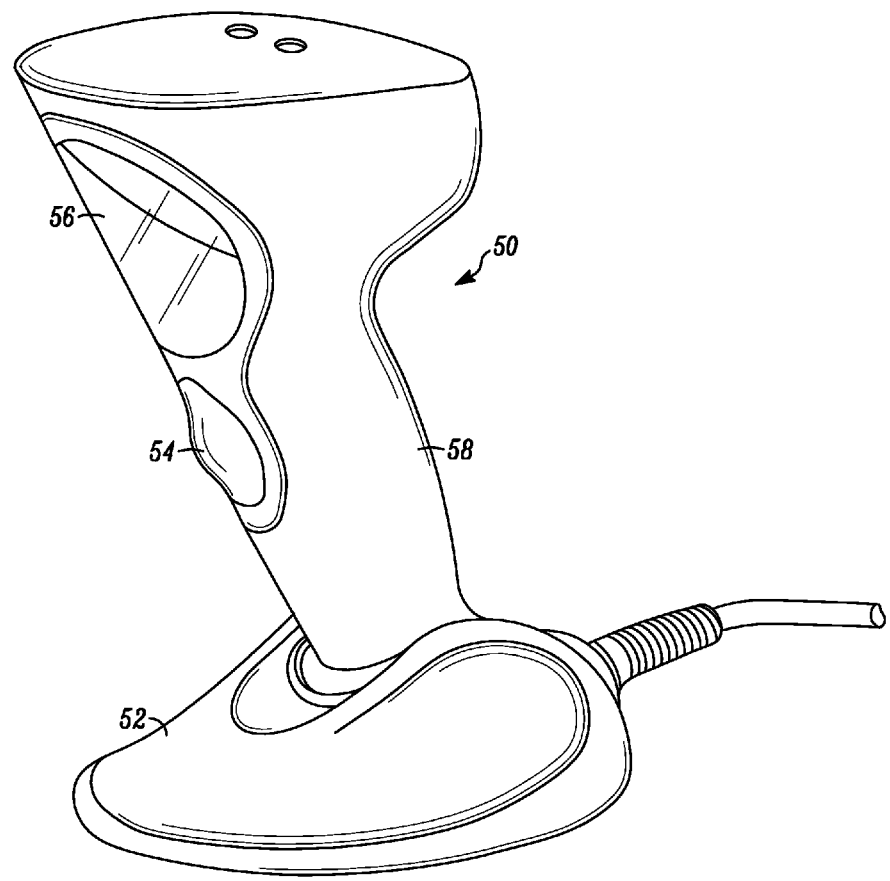
FIG. 1 depicts an imaging scanner in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In one aspect, the invention is directed to a method. The method includes (1) obtaining a captured image of a document physically placed on a background having specifically designed patterns; (2) storing into a memory the captured image that includes an image of the document and an image of the background surrounding the document; and (3) analyzing the captured image to search for a boundary of the document in the captured image, where step of analyzing includes distinguishing the image of the background from the image of the document.

Figure 2:
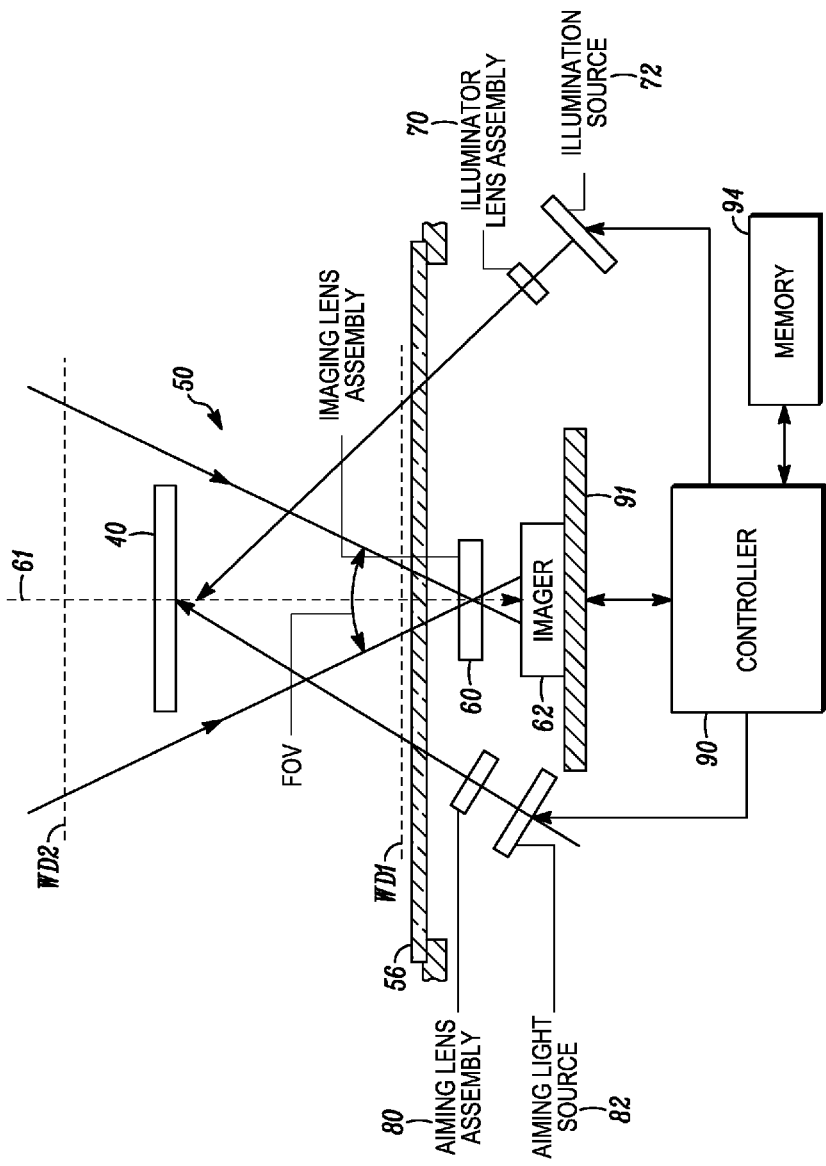
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens assembly 60 along an optical path or axis 61 through the window 56. Generally, the imaging sensor 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens assembly 60. Some of the imaging scanners can include an auto-focus system to enable a barcode be more clearly imaged with the imaging sensor 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the imaging sensor 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

One of the applications of the imaging scanner 50 is for document capture. Document capture is to segment a document from an image containing the document. The document can be a doctor's prescription, an invoice, etc. The image can be taken from a portable imaging scanner 50 as shown in FIG. 1; it can also be taken from a bi-optics imaging scanner or other kinds of imaging-based barcode scanners. Sometimes, the document to be captured has some features specially designed for the ease of being captured by imaging devices. One of these features is a rectangular barcode printed on a specific location of the document. By detecting the four corners of the barcode, the four corners of the document (assuming the document is a rectangle) can be calculated based on pre-determined relations between the size and location of the barcode and the document.

Figure 3:
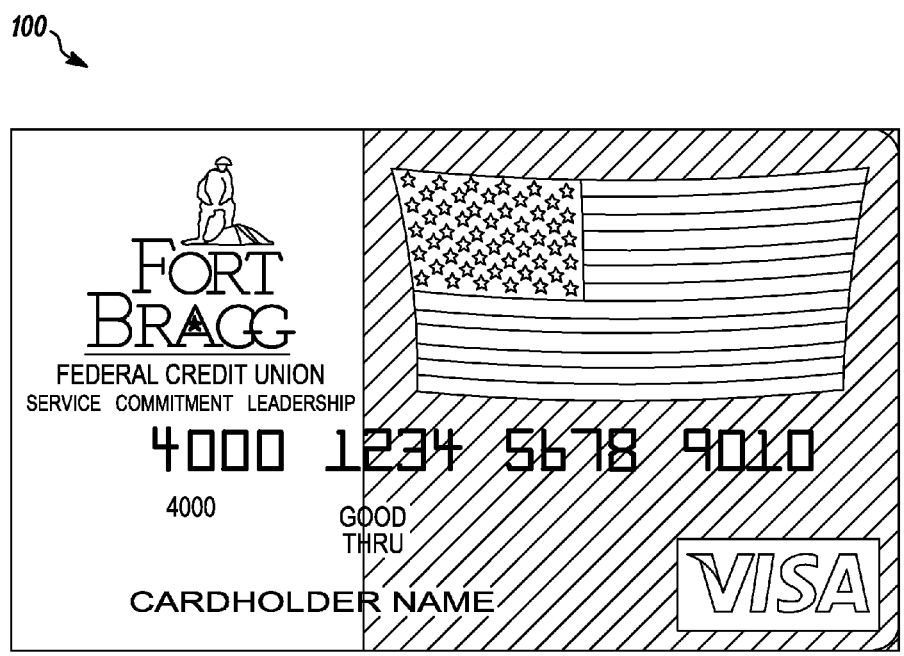
FIG. 3 shows a credit card that has some irregular patterns.

In many cases, however, the document is just an ordinary document that does not have specific features that facilitate the document capture. Capturing this kind of document is called free form document capture. The challenge faced by free form document capture is find the boundary of the document. When a document consists of mostly white space placed on a white background, detecting the background is difficult and error-prone. In this specific case, we may put the document on a dark background to facilitate the capture. Or vice-versa: put a dark document on a light background. However, the above method does not solve all the problem faced free form document capture. If the documents are neither dark nor light but have an irregular pattern, such as the document 100 as shown in FIG. 3, neither dark nor light background will help.

Figure 5:
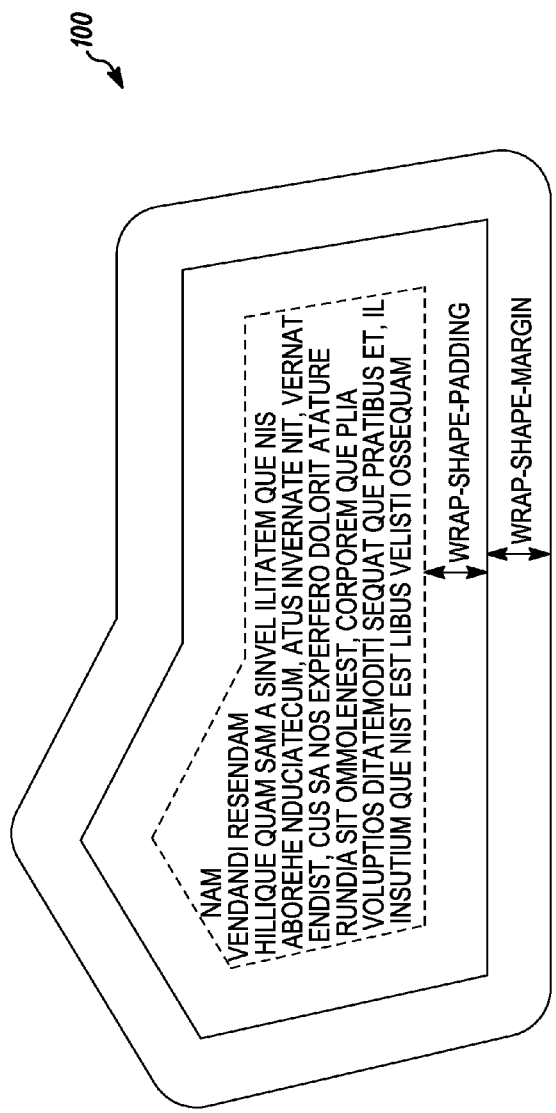
FIG. 5 shows an irregular shaped document.

Sometimes, the document has some rectangular box that looks like a border but only contains part of the document, such as the document 100 as shown in FIG. 4. The document capture may also just capture part of the document enclosed by the box. Another obstacle faced by free form document capture is rectangular shaped document, such as the document 100 as shown in FIG. 5. Since the border of these documents is not well defined or pre-defined, finding the border is also difficult, and sometimes, impossible.

A method aiming at solving the segmentation (border finding) problems faced by current free form document capture is to use a special background. The method includes putting the documents to be captured on a background with specifically designed patterns. In some of the implementations, the pattern printed on this background material is designed in such way that it is easy, by the capturing algorithm, to distinguish between it and the document, and easy to recognize. In some of the implementations, the pattern is designed to be unique and with sufficiently fine features to ensure a certain degree of precision. There could be more than one kind of background pattern to choose from in case the same pattern is found on the document as well.

Figure 6:
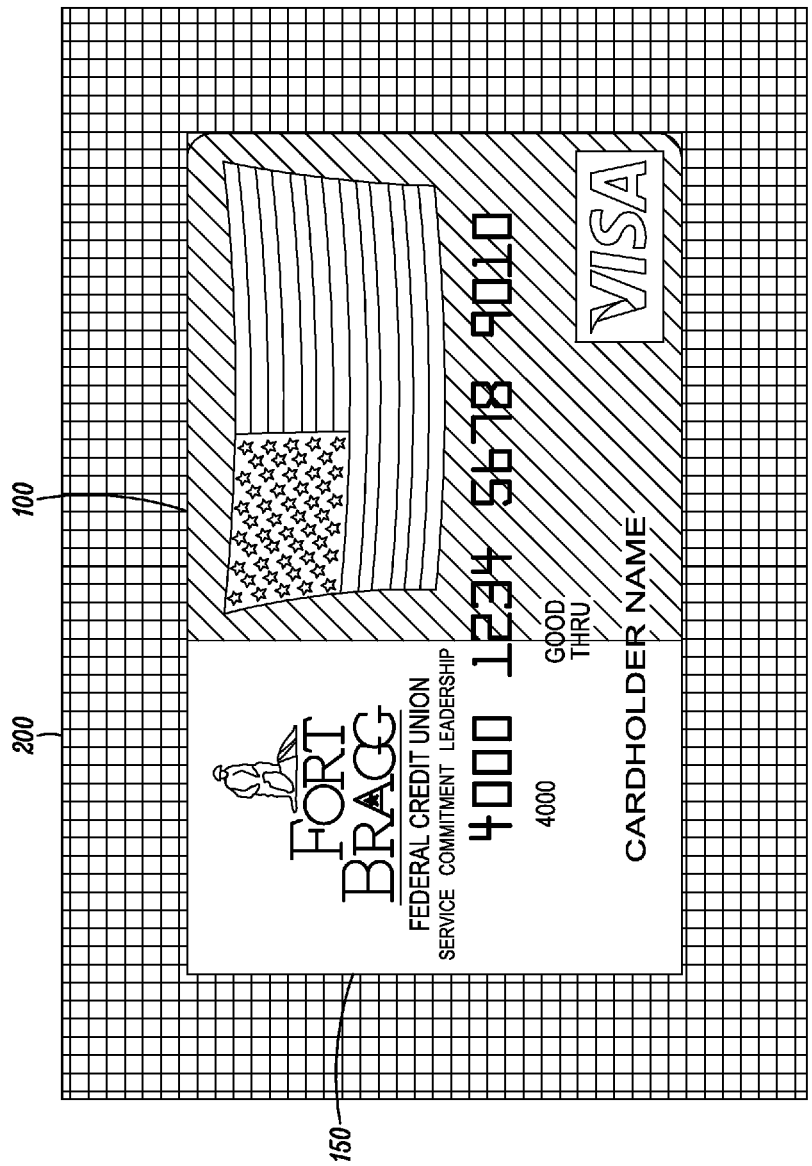
FIG. 6 shows that the credit card of FIG. 3 is placed on a background of grid of small squares.
Figure 7:
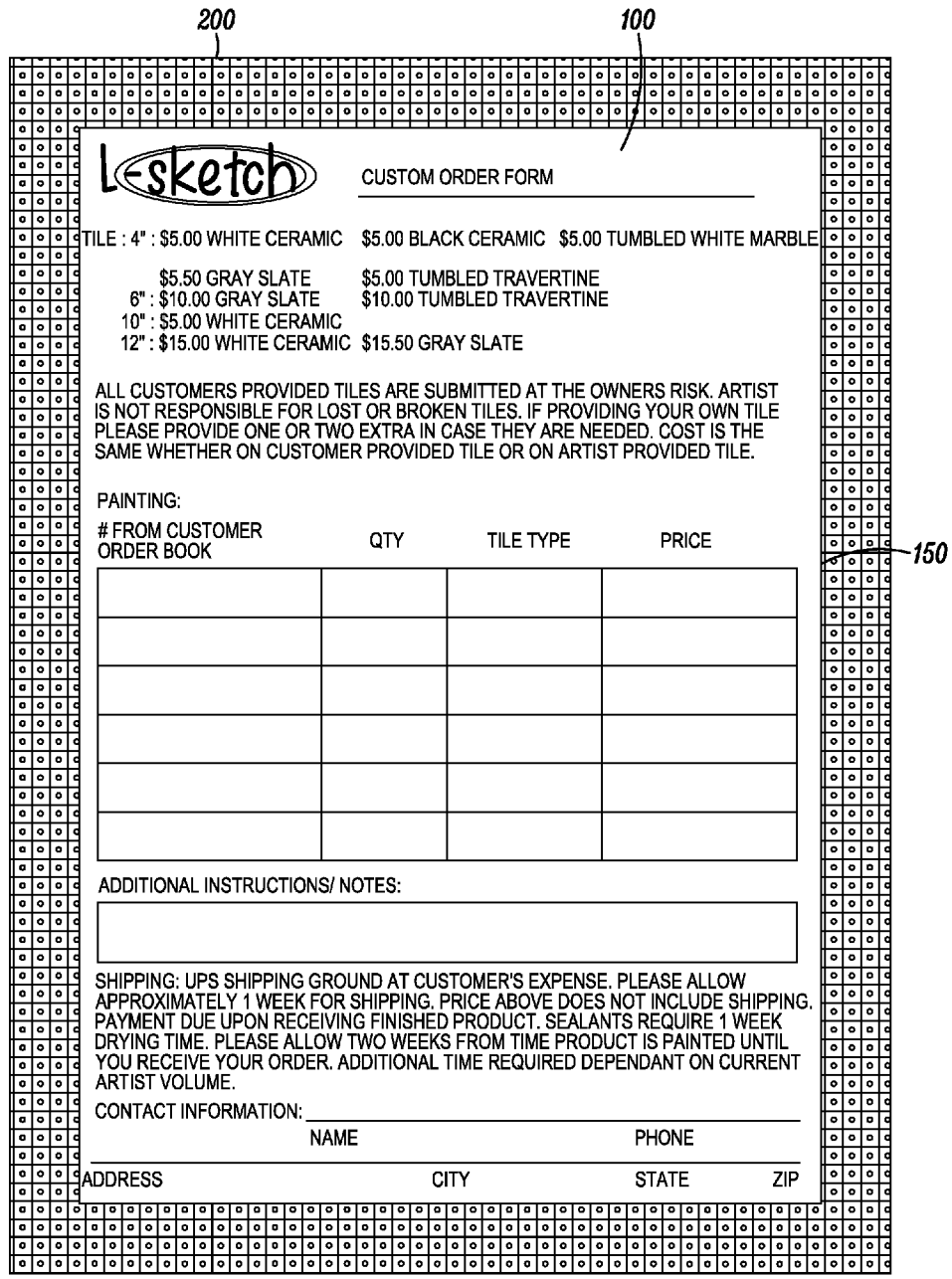
FIG. 7 shows that the document of FIG. 4 is placed on a background consisting of bull's eyes.

One example of such pattern is grid consists of squares. FIG. 6 shows that the credit card 100 of FIG. 3 is placed on a background 200 of grid of small squares. The border 150 of the credit card is very easy to be recognized on this background. FIG. 7 shows that the document 100 of FIG. 4 is placed on a different background 200 consisting of bull's eyes. This pattern is both unique and easy to detect by the capturing algorithm using matching filter designed for bull's eyes. Again, the border 150 of the document 100 is very easy to be recognized on this background. In some implementations, the background can be tiled with one or more predetermined sub-patterns. The sub-pattern can have a square shape, a rectangular shape, a triangular shape, or other shapes that can be used as tiles. In some implementations, the specifically designed patterns on the background include periodically positioned squares or rectangles.

In some implementations, it is not necessary to tell the document capturing device what the pattern of the background is. The pattern of the background can be automatically detected by checking several spots near the border of the image. The capturing device can search for pre-defined patterns to determine what patterns is currently used. Another benefit of using the proposed method is having capability to measure the size of the document precisely. To achieve this, the capturing device just needs to know the size of a repeating unit in the background patterns. In above examples as shown in FIGS. 6-7, this is the size of small square or bull's eye.

Figure 8:
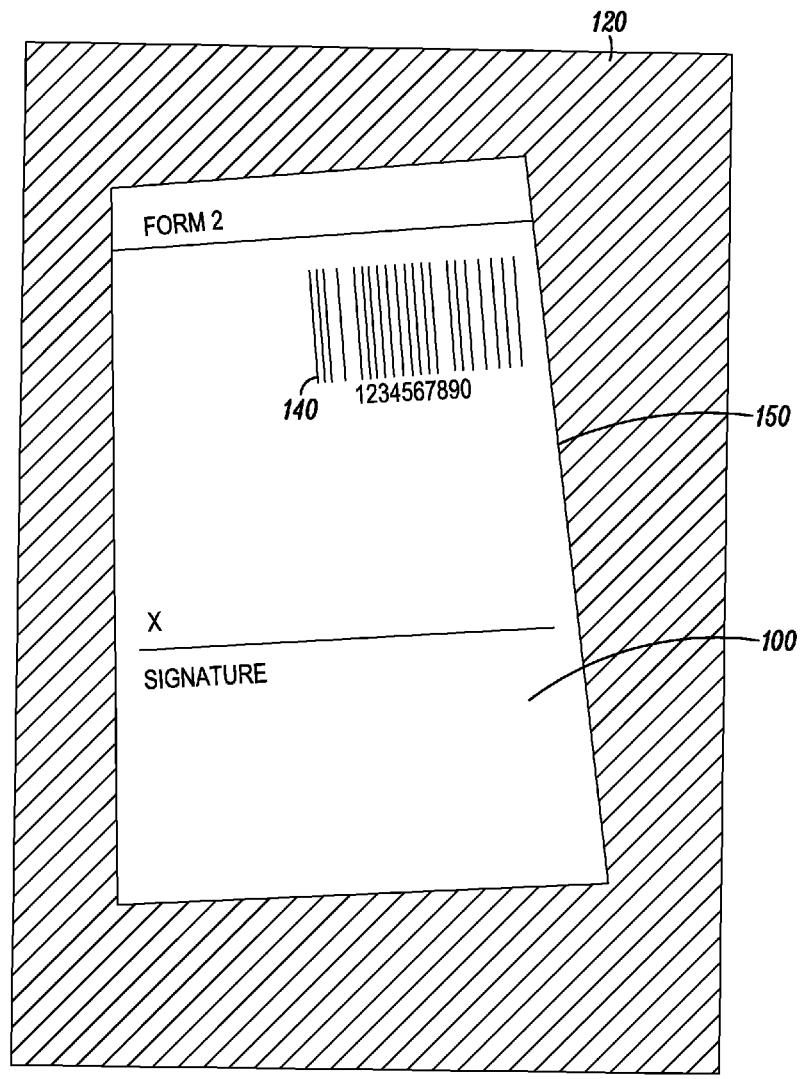
FIG. 8 shows that the document captured by a portable imaging scanner may have capture imperfections.
Figure 9:
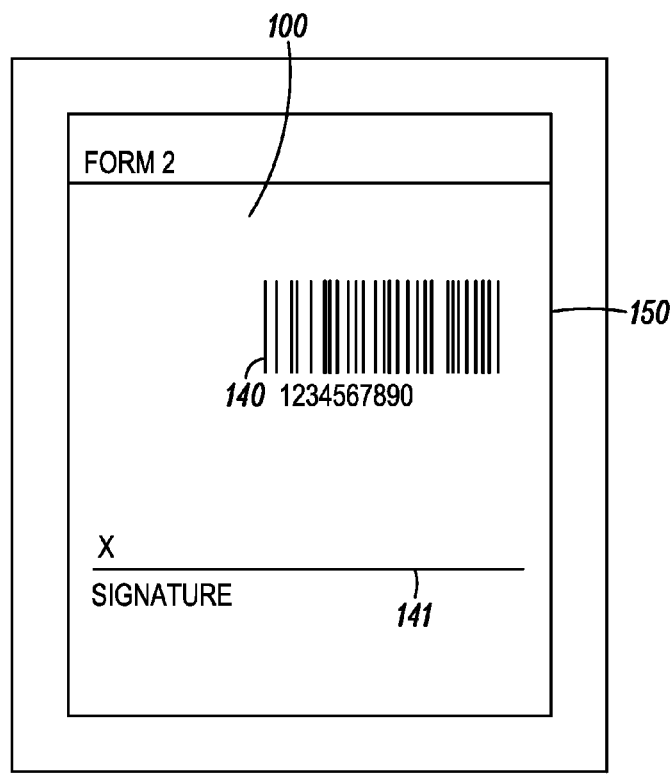
FIG. 9 shows that the boundary of the document in FIG. 8 can be transformed into a rectangle.

Sometimes, it may be necessary to remove capture imperfections such as skew that are commonly present in the document captured by a portable imaging scanner 50 of FIG. 1. Once the boundary 150 of the document 100 in FIG. 8 is found, the boundary 150 can be transformed into a rectangle as shown in FIG. 9. In FIG. 9, the image of the document 100 and the image of the barcode 140 are all improved. The improved image of the barcode 140 in FIG. 9 can be decoded with improved performance.

In addition to the specific embodiments that have been described, various modifications and changes are possible. In general, once the boundary 150 of the document 100 in FIG. 8 is found, the boundary 150 can be restored to its original shape. The original shape of the document 100 can be a rectangle, a square, a circle, a triangle, or other shapes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
obtaining a captured image of a document physically placed on a background, the background having specifically designed patterns, the captured image being obtained with an imaging arrangement that comprises an imaging sensor having an array of photosensitive elements, a lens system operative to focus light reflected from the document onto the array of photosensitive elements in the imaging sensor, and wherein the specifically designed patterns of the background are distinguishable from any pattern found on the document;
storing into a memory the captured image obtained by the imaging sensor, the captured image including an image of the document and an image of the background surrounding the document; and
analyzing the captured image to search for a boundary of the document in the captured image, wherein said analyzing includes distinguishing the image of the background from the image of the document.

2. The method of claim 1, wherein the imaging arrangement is a barcode reading arrangement including a decoder for decoding an image of a barcode on the document.

3. The method of claim 1, wherein the background is tiled with one or more predetermined sub-patterns.

4. The method of claim 1, wherein the background is tiled with a sub-pattern having a square shape.

5. The method of claim 1, wherein the background is tiled with a sub-pattern having a rectangular shape.

6. The method of claim 1, wherein the specifically designed patterns on the background includes periodically positioned squares.

7. The method of claim 1, wherein the specifically designed patterns on the background includes periodically positioned rectangles.

8. The method of claim 1, further comprising:
measuring a size of the document by comparing the size of the document with the size of a repeating unit in the background.

9. A method comprising:
obtaining a captured image of a document physically placed on a background, the background having specifically designed patterns, the captured image being obtained with an imaging arrangement that comprises an imaging sensor having an array of photosensitive elements, a lens system operative to focus light reflected from the document onto the array of photosensitive elements in the imaging sensor, and wherein the specifically designed patterns of the background are distinguishable from any pattern found on the document;
storing into a memory the captured image obtained by the imaging sensor, the captured image including an image of the document and an image of the background surrounding the document;
analyzing the captured image to search for a boundary of the document in the captured image, wherein said analyzing includes distinguishing the image of the background from the image of the document; and
processing the captured image of the document to improve the image of the document by transforming the boundary of the document to a rectangle.

10. A method comprising:
obtaining a captured image of a document physically placed on a background, the background having specifically designed patterns, the captured image being obtained with an imaging arrangement that comprises an imaging sensor having an array of photosensitive elements, a lens system operative to focus light reflected from the document onto the array of photosensitive elements in the imaging sensor, and wherein the specifically designed patterns of the background are distinguishable from any pattern found on the document;
storing into a memory the captured image obtained by the imaging sensor, the captured image including an image of the document and an image of the background surrounding the document;
analyzing the captured image to search for a boundary of the document in the captured image, wherein said analyzing includes distinguishing the image of the background from the image of the document;
processing the captured image of the document to improve the image of the document by restoring the boundary of the document to an original shape; and
decoding an image of a barcode on the document.

11. The method of claim 10, said restoring the boundary of the document comprises:
transforming the boundary of the document to the original shape of a rectangle.

12. The method of claim 10, said restoring the boundary of the document comprises:
transforming the boundary of the document to the original shape of a circle.

13. An apparatus comprising:
an imaging sensor having an array of photosensitive elements for obtaining a captured image of a document physically placed on a background, the background having specifically designed patterns that are distinguishable from any pattern found on the document;
a lens system operative to focus light reflected from the document onto the array of photosensitive elements in the imaging sensor; and
a processor configured for
storing into a memory the captured image of the document obtained by the imaging sensor, the captured image including an image of the document and an image of the background surrounding the document, and
analyzing the captured image to search for a boundary of the document in the captured image, wherein said analyzing includes distinguishing the image of the background from the image of the document.

14. The apparatus of claim 13, further comprising a decoder for decoding an image of a barcode on the document.

15. The apparatus of claim 13, wherein the background is tiled with one or more predetermined sub-patterns.

16. The apparatus of claim 13, wherein the background is tiled with a sub-pattern having a square shape.

17. The apparatus of claim 13, wherein the background is tiled with a sub-pattern having a rectangular shape.

18. The apparatus of claim 13, wherein the specifically designed patterns on the background includes periodically positioned squares.

19. The apparatus of claim 13, wherein the specifically designed patterns on the background includes periodically positioned rectangles.

20. The apparatus of claim 13, wherein the processor is further configured for
measuring a size of the document by comparing the size of the document with the size of a repeating unit in the background.

21. An apparatus comprising:
an imaging sensor having an array of photosensitive elements for obtaining a captured image of a document physically placed on a background, the background having specifically designed patterns that are distinguishable from any pattern found on the document;
a lens system operative to focus light reflected from the document onto the array of photosensitive elements in the imaging sensor;
a processor configured for
storing into a memory the captured image of the document obtained by the imaging sensor, the captured image including an image of the document and an image of the background surrounding the document, and
analyzing the captured image to search for a boundary of the document in the captured image, wherein said analyzing includes distinguishing the image of the background from the image of the document; and
wherein the processor is further configured for processing the captured image of the document to improve the captured image of the document by transforming a reference box to a rectangle.

22. An apparatus comprising:
an imaging sensor having an array of photosensitive elements for obtaining a captured image of a document physically placed on a background, the background having specifically designed patterns that are distinguishable from any pattern found on the document;
a lens system operative to focus light reflected from the document onto the array of photosensitive elements in the imaging sensor;

a processor configured for
  storing into a memory the captured image of the document obtained by the imaging sensor, the captured image including an image of the document and an image of the background surrounding the document, and
  analyzing the captured image to search for a boundary of the document in the captured image, wherein said analyzing includes distinguishing the image of the background from the image of the document; and
  wherein the processor is further configured for processing the captured image of the document to improve the image of the document by restoring the boundary of the document to an original shape, and decoding an image of a barcode on the document.

23. The apparatus of claim 22, said restoring the boundary of the document comprises:
  transforming the boundary of the document to the original shape of a rectangle.

24. The apparatus of claim 22, said restoring the boundary of the document comprises:
  transforming the boundary of the document to the original shape of a circle.

* * * * *